United States Patent [19]

Gagne

[11] 4,174,956
[45] Nov. 20, 1979

[54] METHOD AND APPARATUS FOR MOLTEN METAL FLOW DIFFUSION IN A FLOAT GLASS TANK

[75] Inventor: Robert Gagne, New Kensington, Pa.

[73] Assignee: PPG Industries, Inc., Pittsburgh, Pa.

[21] Appl. No.: 928,047

[22] Filed: Jul. 26, 1978

[51] Int. Cl.² .............................................. C03B 18/02
[52] U.S. Cl. ................... 65/99 A; 65/182 R
[58] Field of Search ........................... 65/99 A, 182 R

[56] References Cited

U.S. PATENT DOCUMENTS

| | | | |
|---|---|---|---|
| 3,479,171 | 11/1969 | Robinson et al. | 65/99 A |
| 3,495,617 | 12/1969 | Lawrenson | 65/182 R |
| 3,684,475 | 8/1972 | Bondareu et al. | 65/182 R |
| 3,930,828 | 1/1976 | Kunkle | 65/99 A |
| 3,930,829 | 1/1976 | Sensi | 65/99 A |
| 4,012,216 | 3/1977 | Marchand | 65/99 A |

FOREIGN PATENT DOCUMENTS 419481 10/1974 U.S.S.R. ................... 65/182 R

*Primary Examiner*—Arthur D. Kellogg
*Attorney, Agent, or Firm*—Paul A. Leipold

[57] ABSTRACT

A method and apparatus for reducing longitudinal distortion in float glass is disclosed. A beam or barrier having cross-hatched grooves is installed below the advancing float glass ribbon in a float glass-forming chamber. The barrier acts to divert or diffuse laterally the molten metal which is being drawn by interfacial drag with the bottom surface of the glass. The diffusion evens the heat on the undersurface of the glass and reduces glass distortion.

19 Claims, 5 Drawing Figures

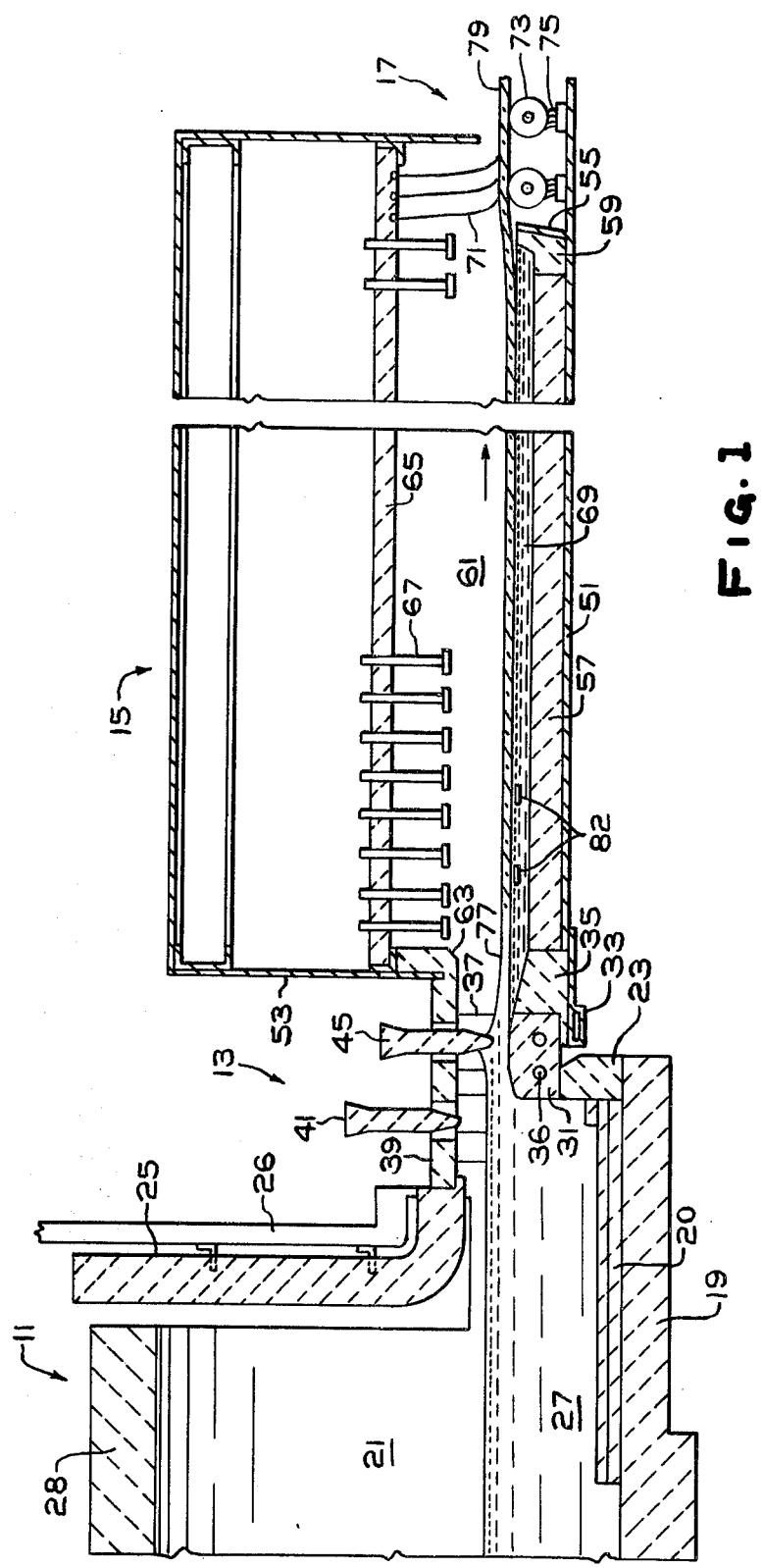

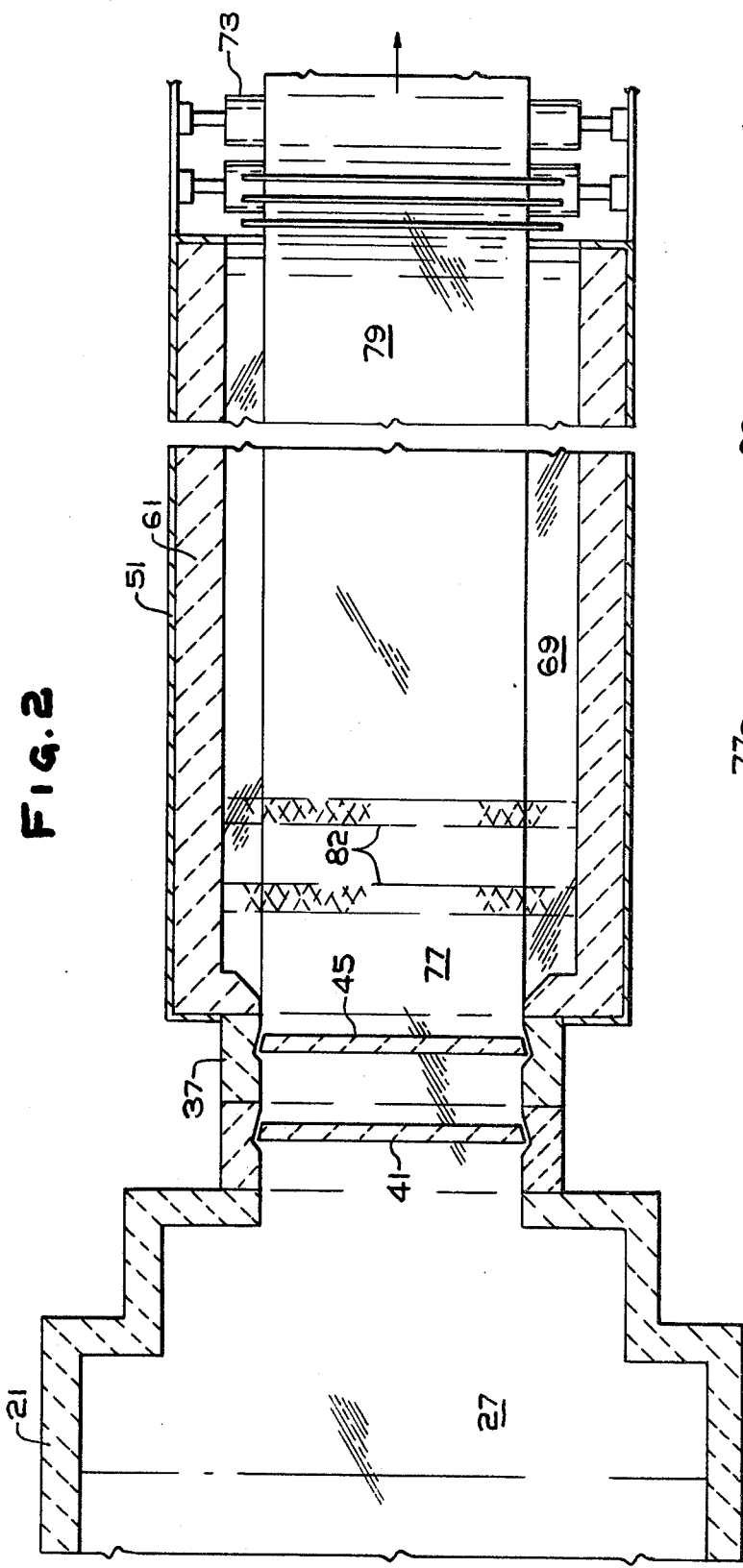
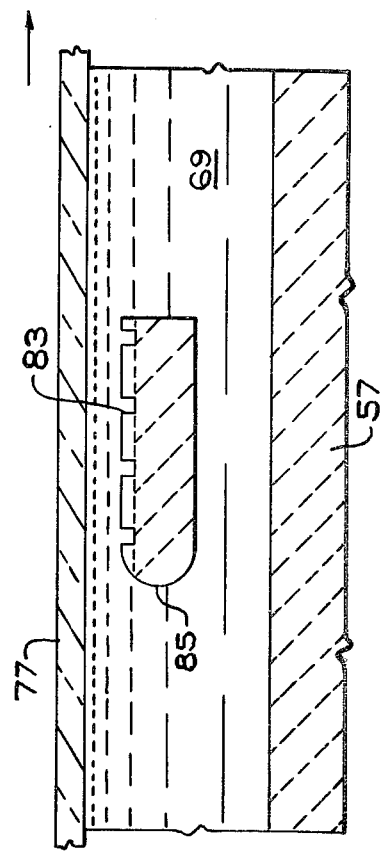

METHOD AND APPARATUS FOR MOLTEN METAL FLOW DIFFUSION IN A FLOAT GLASS TANK

BACKGROUND OF THE INVENTION

1. Field of the Invention

This invention relates to a method and apparatus for manufacture of a continuous sheet of flat glass by supporting molten glass on a pool of molten metal and advancing it along the surface of the pool of molten metal while cooling it to form a continuous sheet of flat glass. More particularly, this invention relates to a method for controlling the flow of tin which is drawn along with the molten glass as it advances through the molten metal bath.

2. Discussion of the Prior Art

It has been proposed in the prior art that various types of barriers or dams be utilized to restrict the flow of the metal in the molten metal bath as the float glass is formed and cooled on the bath. The references described below are representative of the devices which are pertinent to the instant invention.

The U.S. Pat. No. 3,930,829 to Sensi discloses an arrangement of dams both in the transverse and longitudinal direction to control the movement of tin in a molten bath for glass formation. The dams of Sensi are extended from the bottom of the chamber and may closely approach the surface of the glass.

U.S. Pat. No. 3,930,828 to Kunkle discloses another system of dams to divide the molten metal of a float glass-forming tank into compartments which may be individually cooled or heated in order to regulate the forming process.

U.S. Pat. No. 3,607,199 to Itakura discloses a U-shaped dam near the forming region that acts to control the flow of molten metal in a region directly adjacent an entry location of glass into a float bath.

U.S. Pat. No. 3,483,617 to Lawrenson discloses a series of buoyant depressible barriers which are adapted to raise against the bottom of float glass being formed and thereby restrict the movement of tin or other molten metal longitudinally without interfering with the advancement of float glass through the bath.

The above systems while aiding in control of tin movement which introduces some defects in float glass do not effectively inhibit longitudinal distortion which is believed caused by the movement of tin within the bath closely adjacent the lower surface of the glass as it moves through the bath. This tin becomes unevenly heated in the transverse direction and leads to the longitudinal distortion defect.

The system of Lawrenson while inhibiting some flow of metal closely with the bottom of the glass has not proven feasible as the barriers may tend to cause defects when they scrape on the bottom surface of the floating glass as it hardens. Further, at times the barriers are depressed by the flow of the tin or other molten metal and therefore allow the tin flowing with the glass to pass over them and therefore do not prevent longitudinal defects.

SUMMARY OF THE INVENTION

It is an object of this invention to overcome the disadvantages of the prior art.

It is an additional object of this invention to produce flat glass with few defects.

It is an additional further object of this invention to produce glass without centerline defects.

It is another object of this invention to produce flat glass without micro-distortions.

It is another object of this invention to produce glass of substantially uniform thickness in the transverse direction across the width of a continuous sheet or ribbon of glass.

It is an additional object of this invention to produce flat glass with fewer optical defects.

These and other objects of the invention are accomplished generally by providing at least one barrier in the tin or other molten metal bath on which the float glass is formed. The barrier of the invention is situated as close to the glass as possible without having the glass stick to the barrier and has a surface of grooves which radiate from the direction of travel of the glass. These cross-cut or intersecting grooves act to direct the tin which is being carried by the moving float glass in transverse directions such that the temperatures of the glass is made more isothermal and the currents in the tin do not lead to longitudinal distortion.

In a preferred embodiment of the invention, two barriers are located in the forming region of a float glass bath and are situated very close to the surface of the tin and the bottom surface of the glass. These barriers have grooves of a cross-cut nature angled about 5° to about 30° from the direction of movement of the float glass. The barriers preferably do not extend to the bottom of the tin bath so they allow free movement of the tin beneath them.

BRIEF DESCRIPTION OF THE DRAWINGS

FIG. 1 is a sectional elevation view of an apparatus for producing flat glass in accordance with this invention.

FIG. 2 is a sectional plan view of the apparatus shown in FIG. 1.

FIG. 5 is a partial sectional elevation of the tin diffuser of the invention taken along the section line 5—5 of FIG. 4.

DESCRIPTION OF THE PREFERRED EMBODIMENTS

Figure 3:
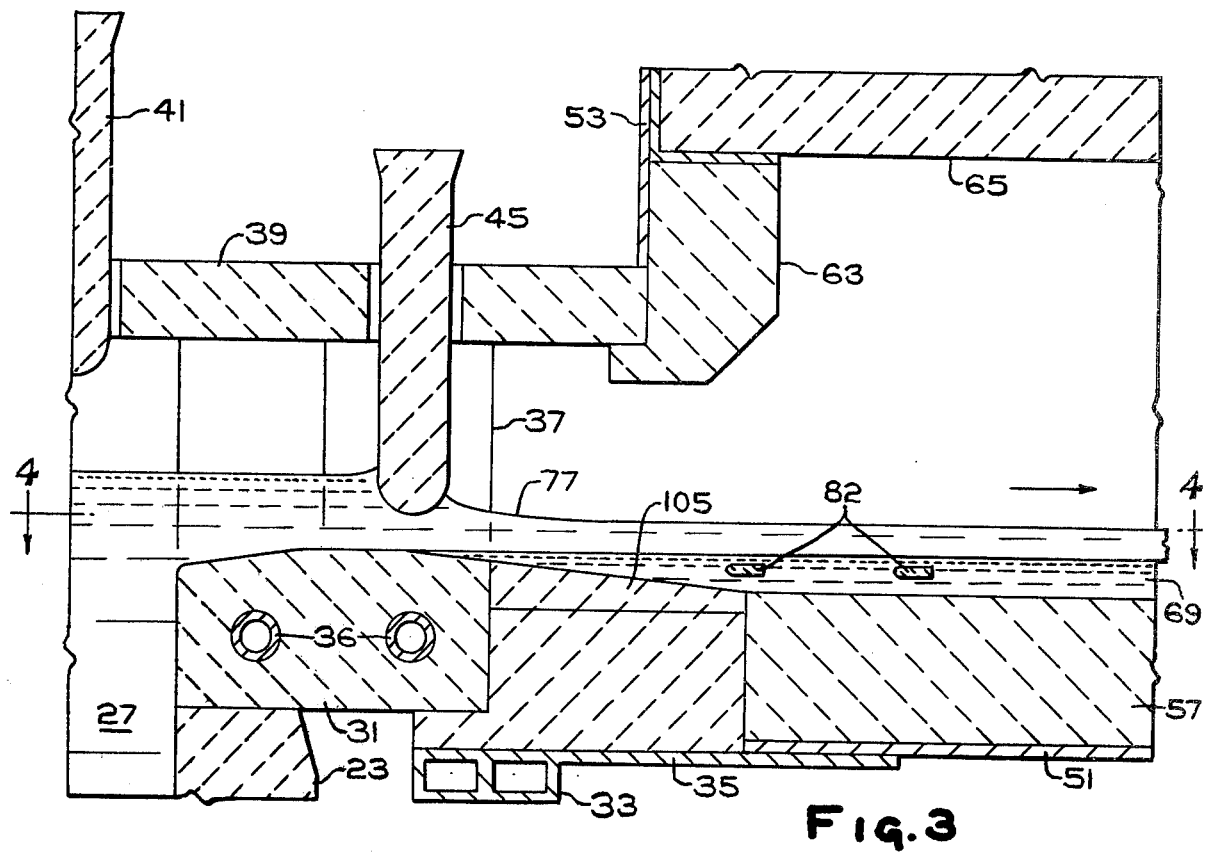
FIG. 3 is a partial sectional elevation view of the delivery facility and upstream end of the forming chamber shown in FIG. 1 illustrating the preferred location of the tin diffuser barrier of the invention.

Referring now to FIGS. 1 and 2 there is shown a view of a suitable apparatus for carrying out the present invention. The glass-making apparatus comprises a furnace 11, delivery means 13 and a forming chamber 15 and a glass removal facility 17. It will be understood that the lifting and conveying apparatus employed in the practice of this invention may be designed to cause the glass to be conveyed along either a horizontally extending path as shown or along an upwardly extending path.

The glassmaking furnace 11 includes a melting section (not shown) and a refiner or conditioner, the end of which is shown. The refining or conditioning section of the furnace 11 comprises a furnace bottom 19 preferably with a raised section 20, side walls 21 and a front basin wall 23. The furnace further comprises an upper front wall 25 which preferably is suspended or supported from above by a structural support 26 and a roof 28 overlying the upper portion of the furnace. A pool of molten glass 27 is maintained in the furnace.

The delivery means 13 includes a threshold 31 resting on a cooling block 33 or other support. A cast refractory seal 35 or the like is disposed between the threshold 31 and the cooling block 33. Extending through the holes in the threshold are conduits or pipes 36 for transporting coolant or the like through the interior of the threshold 31 and for controlling its temperature during use. At the ends of the threshold 31 there are side wall portions or jambs 37 on the sides of the channel through which molten glass may be delivered from the pool of molten glass 27 residing in the bottom portion of the furnace 11. The top of the delivery means 13 is defined by a roof 39. The roof is preferably a flat arch which is supported by supporting means (not shown) extending above it and connected to flat arch supporters embedded in the flat arch itself. Extending transversely across the delivery means 13 are two gates or tweels. The first tweel is a backup tweel 41 connected to a support assembly (not shown) for raising or lowering it into engagement in the pool of molten glass 27. The second tweel is a control tweel 45 supported by support assembly (not shown) for raising and lowering the tweel. The tweel is held in operating position in contact with the molten glass to be delivered for forming. The control tweel 45, along with the threshold 31 and the jambs 37, define an opening through which a layer of molten glass may be delivered for forming.

The forming chamber 15 comprises a bottom casing 51. This casing is preferably a casing constructed of metal, such as steel. The casing is preferably impervious to the molten metal in the chamber. The forming chamber 15 further comprises a top casing 53 including a top, ends and side portions. The top casing is also preferably constructed of impervious metal. An end piece or lip casing 55 is disposed across the forming chamber at its downstream end and, connected to the bottom casing 51. Disposed within the bottom casing 51 is a refractory bottom 57, preferably a refractory bottom that has been cast in place inside the bottom casing 51 between the inlet end bottom 35 and an exit lip 59 mounted or cast against the lip casing 55. Preferably embedded within the bottom refractory 57 are pipes, not shown, for temperature regulation.

The forming chamber 15 further comprises refractory side walls 61. These, along with the bottom refractory 57, the threshold 31 and the exit lip 59, define a container for holding a pool of molten metal.

The upper portion of the chamber further includes a lintel 63 at its upstream end. This lintel 63 may be used as a means for supporting delivery means roof 39. Additionally, the upper portion of the chamber includes a ceiling or roof 65 preferably constructed of refractory material suitable for radiating or absorbing heat uniformly over the area facing the glass beneath it during operation. Extending through the ceiling of the forming chamber are controllable heating elements 67 used to control the rate of heat removal from the glass during forming. These heating elements are connected to bus bars (not shown) which are connected, in turn, to a source of power (not shown). The upper portion of the forming chamber 15 includes a top casing end wall which may extend over the glass removal or withdrawal facility 17 at the downstream end of the forming chamber 15. Alternatively, a separate hood may be provided over the glass removal facility 17. Disposed within the bottom container portion of the forming chamber is a pool of molten metal 69, preferably molten tin or an alloy of tin.

At the downstream end of the forming chamber is the glass removal facility 17 for withdrawing a continuous sheet of glass from the surface of the pool of molten metal 69 and for conveying a withdrawn sheet of glass from the forming chamber 15. The glass removal facility includes curtains 71 or other barriers or seals to segregate the headspace of the forming chamber from the outside environment. These are preferably flexible curtains of heat resistant cloth (e.g., asbestos) or the like. The glass removal facility further includes liftoff rolls 73 mounted in a position to lift and convey a glass sheet from the forming chamber. These rolls 73 are provided with seals 75, usually of graphite, to seal the bottom portion of the forming chamber from the outside environment.

When making flat glass using the apparatus described, a layer of molten glass 77 is delivered onto the molten metal 69 in the upstream end of the forming chamber. This glass is cooled and forces are imparted to the glass, for example, by the action of rolls 73. This causes the glass to advance along the surface of the pool of molten metal and to form a continuous sheet of glass that is dimensionally stable (that is, it assumes a stable thickness and width that is maintained as the glass is withdrawn from the forming chamber). The applicant recognizes that the term "bath" has at times been used in the art to mean the pool of molten metal which the glass is formed and at other times to mean the forming chamber when the glass sheet formation takes place on the molten metal bath. However, in this specification, the applicant intends to refer to the structure as the forming chamber and only use the term "bath" to refer to the pool of molten metal. The terms "ribbon" and "sheet" are used interchangeably to refer to the strip of glass formed on the bath in the forming chamber. The directions "upstream" and "downstream" are defined by the direction of glass flow through the process; that is, glass flows from an upstream portion of the glassmaking apparatus toward a downstream portion of the glassmaking apparatus.

Extending across the forming chamber 15 between sidewalls 61 are illustrated two of the molten metal flow diffusers which form part of the system of the invention. The molten metal flow diffuser barriers are cross-hatched with grooves on their upper surfaces to divert the flow of the molten metal which is drawn by interfacial frictional drag of the glass as the glass advances on the tin surface. The cross-hatched grooves of the tin flow diffusers serve to direct the flow of the tin in transverse directions thereby intermingling various portions of the tin and evening the heat on the under-surface of the glass sheet as it is formed. This evening of the traverse heat distribution reduces the longitudinal defects that are caused by uneven thinning of the glass due to uneven temperature of the glass transverse to its direction of movement. The barriers, as illustrated, are preferably placed as close to the bottom surface of the glass as possible without actually contacting the glass.

The barriers are preferably located in the forming region of the chamber. The forming region is defined herein as that region where the glass is changing in width and/or thickness. The tin diffusers are thus positioned a short distance downstream from the location of molten glass delivery to the forming chamber. An optimum position for the barrier of the invention is just upstream of the point at which the glass begins to solidify because this location gives the greatest decrease in longitudinal distortion of the finished sheet glass.

The molten metal diffuser of the invention is successful in improving even thickness variations of the glass surface that are of 0.001 inch or less. Such micro-distortions contribute to distortion quality problems that arise in formation of thin sheet glass. The diffuser also successfully reduces longitudinal thickness variations of between about 0.01 inch and about 0.005 inch from nominal thickness which are important in optical quality of conventional sheet glasses.

Figure 4:
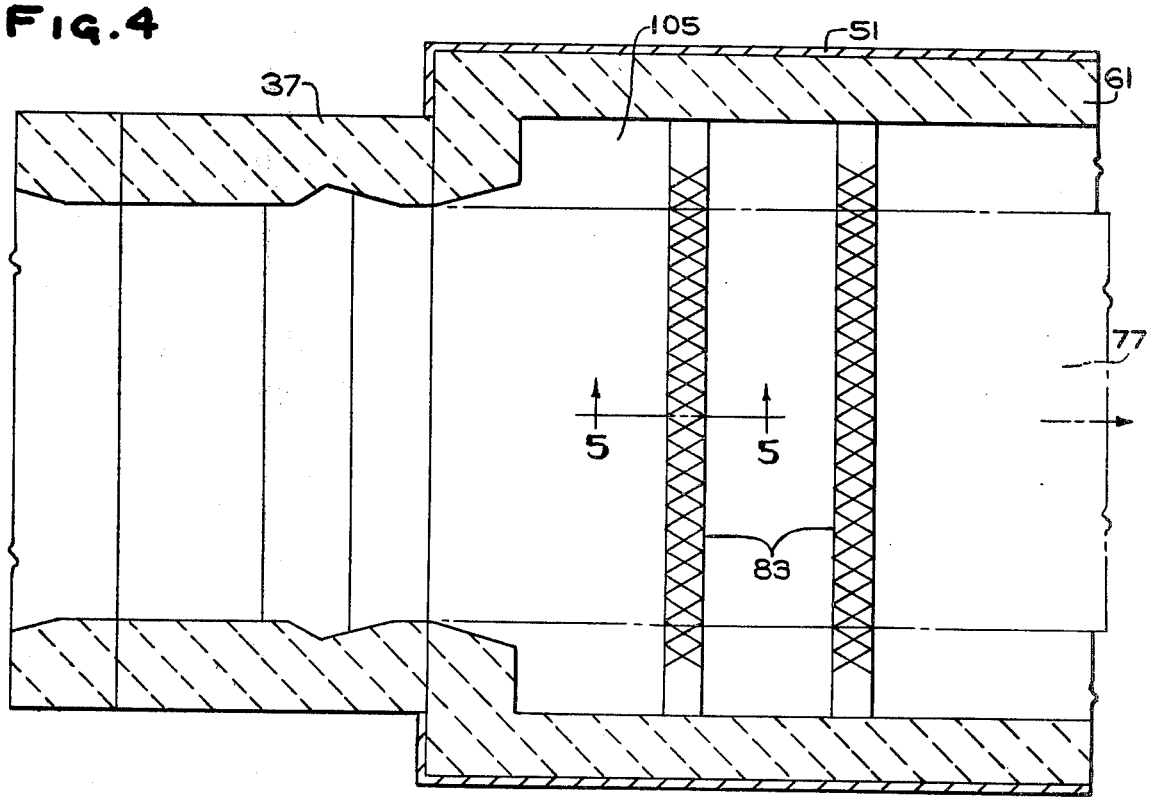
FIG. 4 is a partial sectional plan view of the delivery facility and upstream end of the forming chamber seen in FIG. 3 taken along the section line 4—4 of FIG. 3.

As may be seen with reference of FIGS. 3 and 4, the tin diffuser barriers 82 of the invention are located in the upper portion of the tin bath almost in contact with the glass sheet as it moves over the molten metal. The tin diffusers are cross-hatched with grooves 83 that are skewed from the angle of movement of the glass. The grooves are skewed at an angle of between about 5° and about 30° from the direction of the glass flow. While illustrated at the hot end of the forming region, it is also within the invention to place molten metal diffuser barriers intermittently along the entire bath length. The forming region at the hot end is the primary location where centerline distortion is created. However, other points of the bath also contribute to the defect and the optical quality of the glass is improved by evening the heat traverse to the direction of travel that is accomplished by the system of the invention.

With reference to FIG. 5, the barrier generally indicated as 82 is a beam transverse of the direction of glass flow with the top grooved surface 83. The beam is preferably somewhat streamlined as at 85 in order to create less disruption by the location of the barrier in the bath where various convection currents are moving the tin. The bottom of the barrier 82 is located well above the bath bottom 57 so as to allow free movement of the molten metal beneath the beam tin diffuser. The beam may be mounted in place by being placed onto refractory blocks that are set at the margins of the molten metal bath. The blocks may be notched to accept the barrier and it may further be held by another refractory block on the top of the beam.

The tin diffuser beam or barrier may be formed of any material that has the ability to withstand the temperatures of the molten metal bath and not be attacked by the molten metal. Further, the material must be workable so as to allow the formation of the small grooves in its upper surface. Among suitable materials for the barriers are refractories, graphite, refractory coated metals, and metals such as stainless steel. A preferred material is tungsten as it is stable in the bath conditions and relatively easily workable.

The grooves on the upper surface of the barrier may be any frequency and depth which achieves the desired reduction or elimination of longitudinal distortion. The grooves generally are located about ¼ inch apart and may be between about 1/16 and about ⅛ inch deep. The width of the beam may be any width which achieves the desired advantage of the invention. A preferred width is greater than about 2 inches for effective diffusion of the molten metal held by interfacial drag to the bottom of the glass.

While the number of barriers for the preferred embodiment illustrated in the drawings is two, the invention also comprehends the utilization of one barrier or a series of barriers located at other portions of the forming chamber than the hot end or barriers located intermittently the entire length of the chamber. The barriers, no matter where located, will serve to diffuse the molten metal which is carried beneath the surface of the glass and even the temperature differences in the traverse direction of the glass as it moves through the metal bath.

The tin diffuser of the invention may be located at any distance below the bottom of the glass moving over the metal bath that gives the desired elimination or reduction in centerline distortion. The barrier should be as close as possible without risking touching the glass. A preferred depth has been found to be between about 4 and about 6 millimeters for the greatest decrease in longitudinal distortion. However, greater depth may be utilized to achieve some of the desired effects without any risk of touching of the glass caused by variation in the height of the molten metal in the bath. However, the greater depth location does not as effectively diffuse the molten metal that is carried very close to the glass by interfacial drag.

While the invention has been described with the preferred metal diffusion barrier being a beam which allows free movement of tin beneath the beam, the invention also comprehends the utilization of the invention in other types of barriers. Specifically, it is within the invention to groove floating barriers such that as the glass passes over them the molten metal which is being carried by interfacial drag of the moving glass is diffused. Further, it is also possible with the molten metal diffusion system of the invention to groove the tops of dams within the bath to make possible the lateral diffusion of metal as it is carried by frictional drag through the bath by the movement of the glass.

Although this invention has been described with reference to particular embodiments of it which are illustrated here, those skilled in the art of glassmaking will appreciate that the specific embodiments described may be modified without departing from the scope of the invention. For instance, the grooves of the tin diffuser could be shaped other than rectangularly. The grooves could be rounded at the bottom or key-hole shaped without departing from the scope of spirit of this invention. Further, the system of the instant invention could be utilized with other float glass forming processes such as that of Pilkington as illustrated in U.S. Pat. No. 3,220,816 in which glass leaving the furnace is dropped to form a pool in the molten metal from which the float glass is drawn.

I claim:

1. A method of reducing optical distortion, caused by molten metal of nonuniform temperature closely adjacent to a glass ribbon as it passes through a float chamber comprising positioning a barrier in the molten metal across the zone of molten metal movement, said barrier having grooves on its upper surface, closely adjacent and angularly transverse the direction of movement of closely adjacent molten metal in the molten metal bath, said grooves being of sufficient depth such that the molten metal movement closely adjacent said glass is angularly diverted from said direction of movement by said grooves as said glass passes over said barrier.

2. The method of claim 1 wherein said molten metal is diverted 5° to about 30° from the direction of travel of said glass.

3. The method of claim 1 wherein said molten metal comprises tin which is diverted both inwardly and outwardly by cross-hatch grooving.

4. The method of claim 1 wherein said molten metal comprises tin and the diverting of the tin takes place in the forming region of the bath.

5. The method of claim 1 wherein said molten metal comprises tin and said tin can flow freely under said barrier.

6. The method of claim 1 wherein said barrier comprises a dam extending from the bottom of the bath with said grooves on the top.

7. A float glass forming chamber barrier comprising an elongated member adapted to be fastened transverse of a float glass bath and having a grooved upper surface wherein the grooves of said upper surface are cross-cut and of a depth sufficient to angularly divert movement of molten metal closely adjacent to float glass passing over said barrier when said barrier is transverse of a float forming chamber.

8. The barrier of claim 7 wherein said grooves are angled between about 5 and about 30 degrees from a normal to the elongated direction of the barrier.

9. The barrier of claim 7 wherein the parallel grooves forming the cross-hatching are about one-quarter inch apart.

10. The barrier of claim 9 wherein said grooves are between about 1/16 and ⅛ inch deep.

11. In a glassmaking apparatus for making a continuous glass sheet wherein the glassmaking apparatus is of the type comprising a glass melting furnace for melting glassmaking ingredients; a forming chamber having a bottom bounded by side members and end members for containing a pool of supporting molten metal; and delivery means connecting the glassmaking furnace and the forming chamber for delivering molten glass from the glassmaking furnace onto the pool of supporting molten metal, the improvement comprising:

a molten metal diffuser mounted immediately below the surface of said molten metal wherein said diffuser has an upper surface of crossing grooves said grooves have a depth sufficient such that molten metal movement closely adjacent the glass is angularly diverted from the direction of said glass movement through said forming chamber.

12. The apparatus of claim 11 wherein said barrier is between about 4 and about 6 millimeters below the bottom of the glass ribbon.

13. The apparatus of claim 11 wherein said diffuser is in the forming section of said forming chamber.

14. The apparatus of claim 13 wherein two diffusers are in said forming region.

15. The apparatus of claim 11 wherein said diffuser is above said tank bottom to allow free movement of said molten metal beneath said diffuser.

16. The apparatus of claim 11 wherein said diffuser extends the full width of said chamber.

17. The apparatus of claim 11 wherein said grooves are angled between 5 and about 30 degrees from a normal to the elongated direction of the barrier.

18. The apparatus of claim 11 wherein said grooves are between about 1/16 inch and ⅛ inch deep.

19. The apparatus of claim 17 wherein grooves are about ¼ inch apart.

* * * * *